(12) United States Patent
Biran et al.

(10) Patent No.: US 11,916,802 B2
(45) Date of Patent: Feb. 27, 2024

(54) DATA TRANSMISSION FLOW CONTROL REGIME

(71) Applicant: INTERNATIONAL BUSINESS MACHINES CORPORATION, Armonk, NY (US)

(72) Inventors: Giora Biran, Zichron-Yaakov (IL); Amit Shay, Kfar Saba (IL); Avraham Ayzenfeld, Hod Hasharon (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/709,512

(22) Filed: Mar. 31, 2022

(65) Prior Publication Data
US 2023/0318984 A1 Oct. 5, 2023

(51) Int. Cl.
*H04L 47/10* (2022.01)

(52) U.S. Cl.
CPC .................................. *H04L 47/39* (2013.01)

(58) Field of Classification Search
CPC ....... H04L 47/10; H04L 47/12; H04L 47/265; H04L 47/28; H04L 47/283; H04L 47/39; H04L 49/505; H04L 49/506
See application file for complete search history.

(56) References Cited

U.S. PATENT DOCUMENTS

| | | | |
|---|---|---|---|
| 8,400,915 B1 * | 3/2013 | Brown ..................... | H04L 47/39 370/429 |
| 8,819,306 B2 | 8/2014 | Ajanovic et al. | |
| 9,571,410 B2 * | 2/2017 | DeCusatis ............ | H04L 47/2466 |
| 2003/0223444 A1 * | 12/2003 | Lambrecht .............. | H04L 47/30 370/229 |
| 2005/0030963 A1 | 2/2005 | Solomon et al. | |
| 2006/0140364 A1 * | 6/2006 | Seko ....................... | H04L 47/39 379/91.02 |
| 2009/0113082 A1 | 4/2009 | Adar et al. | |
| 2012/0014253 A1 * | 1/2012 | Rongong .............. | H04L 49/506 370/242 |
| 2012/0311212 A1 | 12/2012 | Bender et al. | |
| 2013/0290559 A1 | 10/2013 | Chrysos et al. | |
| 2014/0086054 A1 * | 3/2014 | Rongong ................. | H04L 49/35 370/235 |
| 2014/0269274 A1 * | 9/2014 | Banavalikar ........... | H04L 47/39 370/230 |
| 2016/0182391 A1 * | 6/2016 | Theobald ................. | H04L 47/39 370/230 |
| 2019/0068515 A1 * | 2/2019 | Seely ...................... | H04L 47/39 |

OTHER PUBLICATIONS

Sun et al., "Implementation and Analysis of Speculative Flow Control for On-chip Interconnection Network," IEEE, 2011 IEEE 2nd International Conference on Networked Embedded Systems for Enterprise Applications, Dec. 8-9, 2011, 6 pages.

* cited by examiner

Primary Examiner — Kan Yuen
(74) Attorney, Agent, or Firm — Kelli D. Morin (57) ABSTRACT

A credit-based flow control system can utilize speculative credit. If an agent has not received a credit return from a downstream agent for a given period of time, the agent can return speculative credit to an upstream agent. This way, even if the agent is not currently capable of performing operations represented by the speculative credit, the upstream agent can be enabled to proceed with operations.

15 Claims, 5 Drawing Sheets

DATA TRANSMISSION FLOW CONTROL REGIME

BACKGROUND

The systems and methods of the present disclosure relate to credit-based flow control.

The concept of "flow control" describes a variety of ways to manage the transmission of data. Data transmission is described in terms of at least one sender and at least one receiver, where the sender sends the data to the receiver. However, the receiver can only receive data at a particular rate, as the receiver needs at least some time to process the data as it is received. This rate can vary widely between receivers. In essence, flow control schemes are utilized to prevent a sender from overwhelming a receiver.

One common type of flow control is known as "credit-based" flow control. Credit-based flow control utilizes a system of credits as a way of tracking which components have resources available. As an example, a sender may be allotted a certain amount of "credits," which the sender can "spend" by transmitting data to a receiver. As the receiver receives the data, the receiver's resources are utilized for processing the incoming data. As the receiver continues to process the data, the receiver's resources are freed for further use. As this occurs, the receiver returns a corresponding amount of credit back to the sender, indicating that the receiver is capable of receiving additional data. Thus, the receiver is protected from being overwhelmed by the sender, as the sender is unable to send data without the requisite credit.

SUMMARY

Some embodiments of the present disclosure can be illustrated as a first method. The first method includes sending a payload to a downstream agent. The first method also includes monitoring a timer. The first method also includes determining that the downstream agent has not returned a certain amount of credit within a timeout duration. The first method also includes returning a second amount of speculative credit to an upstream agent based on this determination. This first method advantageously enables credit-based flow control systems to utilize speculative credit, making them more resilient to backpressure slowdowns caused by downstream agents encountering issues.

Some embodiments of the present disclosure can be illustrated as a second method. This second method includes all of the steps of the first method, described above. The second method also includes receiving a transmission from the upstream agent, the transmission sent as part of a transaction requiring the upstream agent to spend at least part of the speculative credit. The second method also includes detecting that the downstream agent has still not returned the certain amount of credit after receiving the transmission. The second method also includes instructing the upstream agent to repeat the transmission. The second method also includes dropping the transaction. This second method improves upon the credit-based flow control system implementing speculative credit described in the first method by providing fault handling in case the speculative credit is utilized before the downstream agent returns its credit.

Some embodiments of the present disclosure can be illustrated as a third method. This third method includes all of the steps of the first method, described above. The third method also includes receiving a credit return from the downstream agent after returning the speculative credit. The third method also includes converting the speculative credit to standard credit upon receiving the credit return. This third method improves upon the credit-based flow control system implementing speculative credit described in the first method by recognizing when speculative credit no longer needs to remain speculative, and converting it into standard credit accordingly. This way, if the upstream agent were to send a transaction that would have required the speculative credit, the transaction can be completed. This enables seamless reintegration of the downstream agent into a flow.

Some embodiments of the present disclosure can be illustrated as a first system. The first system may comprise memory and a central processing unit (CPU). The CPU of the first system may be configured to execute instructions to send a payload to a downstream agent. The CPU of the first system may also be configured to monitor a timer. The CPU of the first system may also be configured to determine that the downstream agent has not returned a certain amount of credit within a timeout duration. The CPU of the first system may also be configured to return a second amount of speculative credit to an upstream agent based on this determination. This first system advantageously enables credit-based flow control systems to utilize speculative credit, making them more resilient to backpressure slowdowns caused by downstream agents encountering issues.

Some embodiments of the present disclosure can be illustrated as a second system. The second system may comprise memory and a central processing unit (CPU). The CPU of the second system may be configured to execute instructions to send a payload to a downstream agent. The CPU of the second system may also be configured to monitor a timer. The CPU of the second system may also be configured to determine that the downstream agent has not returned a certain amount of credit within a timeout duration. The CPU of the second system may also be configured to return a second amount of speculative credit to an upstream agent based on this determination. The CPU of the second system may also be configured to receive a transmission from the upstream agent, the transmission sent as part of a transaction requiring the upstream agent to spend at least part of the speculative credit. The CPU of the second system may also be configured to detect that the downstream agent has still not returned the certain amount of credit after receiving the transmission. The CPU of the second system may also be configured to instruct the upstream agent to repeat the transmission. The CPU of the second system may also be configured to drop the transaction. This second system improves upon the first credit-based flow control system implementing speculative credit described above by providing fault handling in case the speculative credit is utilized before the downstream agent returns its credit.

Some embodiments of the present disclosure can be illustrated as a third system. The third system may comprise memory and a central processing unit (CPU). The CPU of the third system may be configured to execute instructions to send a payload to a downstream agent. The CPU of the third system may also be configured to monitor a timer. The CPU of the third system may also be configured to determine that the downstream agent has not returned a certain amount of credit within a timeout duration. The CPU of the third system may also be configured to return a second amount of speculative credit to an upstream agent based on this determination. The CPU of the third system may also be configured to receive a credit return from the downstream agent after returning the speculative credit. The CPU of the third system may also be configured to convert the speculative credit to standard credit in response to receiving the credit return. This third system improves upon the first credit-based flow control system implementing speculative credit described above by recognizing when speculative credit no longer needs to remain speculative, and converting it into standard credit accordingly. This way, if the upstream agent were to send a transaction that would have required the speculative credit, the transaction can be completed. This enables seamless reintegration of the downstream agent into a flow.

Some embodiments of the present disclosure can also be illustrated as a first computer program product comprising a computer readable storage medium having program instructions embodied therewith, the program instructions executable by a computer to cause the computer to receive a transmission from an upstream agent, where the transmission is sent as part of a transaction. The transaction may require the upstream agent to spend a first amount of credit. The program instructions of the first computer program product are also executable to cause the computer to monitor a timer. The program instructions of the first computer program product are also executable to cause the computer to detect, based on the monitoring, that a timeout duration has elapsed. The program instructions of the first computer program product are also executable to cause the computer to return a second amount of speculative credit to the upstream agent based on the detecting. This first computer program product advantageously enables credit-based flow control systems to utilize speculative credit, making them more resilient to backpressure slowdowns caused by downstream agents encountering issues.

Some embodiments of the present disclosure can be illustrated as a second computer program product comprising a computer readable storage medium having program instructions embodied therewith, the program instructions executable by a computer to cause the computer to receive a transmission from an upstream agent, where the transmission is sent as part of a transaction. The transaction may require the upstream agent to spend a first amount of credit. The program instructions of the second computer program product are also executable to cause the computer to monitor a timer. The program instructions of the second computer program product are also executable to cause the computer to detect, based on the monitoring, that a timeout duration has elapsed. The program instructions of the second computer program product are also executable to cause the computer to determine that the transaction has not been completed within the timeout duration. In response, the program instructions of the second computer program product are also executable to cause the computer to return a second amount of speculative credit to the upstream agent based on this determination. This second computer program product advantageously enables credit-based flow control systems to utilize speculative credit in situations where an agent performing a transaction is experiencing a slowdown, making such systems more resilient to backpressure slowdowns that may otherwise arise as a result.

Some embodiments of the present disclosure can be illustrated as a third computer program product comprising a computer readable storage medium having program instructions embodied therewith, the program instructions executable by a computer to cause the computer to receive a transmission from an upstream agent, where the transmission is sent as part of a transaction. The transaction may require the upstream agent to spend a first amount of credit. The program instructions of the third computer program product are also executable to cause the computer to send a payload to a downstream agent, where the payload is based on the transaction. The program instructions of the third computer program product are also executable to cause the computer to monitor a timer. The program instructions of the third computer program product are also executable to cause the computer to detect, based on the monitoring, that a timeout duration has elapsed. The program instructions of the third computer program product are also executable to cause the computer to determine that the downstream agent has not returned a third amount of credit within the timeout duration. In response, the program instructions of the third computer program product are also executable to cause the computer to return a second amount of speculative credit to the upstream agent based on this determination. This third computer program product advantageously enables credit-based flow control systems to utilize speculative credit in situations where a downstream agent processing a payload appears to be experiencing a slowdown. This speculative credit can enable the upstream agent to proceed as if the downstream agent is functioning normally, making the credit-based flow control system more resilient to backpressure slowdowns that may otherwise arise as a result.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to return speculative credit in response to a detected risk of a credit shortage. More particular aspects relate to a system to detect a risk of a credit shortage and to return speculative credit to an upstream agent despite being unable to perform operations guaranteed by the speculative credit.

A typical modern computing system will often include multiple software components interacting with one another. Many of these components, also referred to as "agents," may have specific purposes or goals, such as processing input from a keyboard, controlling pixels of a display device, and the like. Agents may only have access to limited resources (e.g., processing power). As stated, agents frequently interact with one another; these interactions, also called "transactions," often require the consumption of these resources.

As an illustrative example, a user may press an "H" key on a keyboard connected to a computer. Due to how the keyboard is constructed, this results in a specific electrical signal being sent (via a cable) to an input port monitored by a keyboard controller agent. The keyboard controller agent may be configured to process the signals to determine user inputs (e.g., to determine that the received electrical signal indicates that the "H" key has been pressed) and send the input(s) to a higher-level input controller agent. This input controller agent can receive the input from the keyboard controller agent and send it further "downstream" to, for example, a word processing program, which may then update a state of a document to reflect the input character(s).

If agents run out of computing resources, they are unable to perform functions other agents may require them to, making the other agents wait until resources are freed up. This waiting can propagate upstream, forcing additional agents to wait, and so on. Thus, balancing the flow of transactions between agents is a complex but important task in modern computer architecture design. One common approach to this is "credit-based flow control," where agents utilize a "credit" system to track capabilities of other agents. As an analogy, credit is similar to a "reservation"—a first agent may be committed to receiving data from a second agent and performing actions related to that data, where the maximum size of the data is represented by the amount of credit held by the second agent. Credit based flow control is often utilized to implement high-speed networking between agents inside a chip.

Agents may track credit associated with other agents via their own storage. As an example, an input controller agent may have access to a data structure (referred to in this disclosure as a "credit cache"), including a first row indicating that the input controller has 500 bytes (B) of credit with a word processing agent. This 500 B of credit may indicate that the word processing agent is capable of and committed to processing at least 500 B of data the input controller agent may opt to send to it. Thus, if the input controller has 300 B of packets it wishes to send to the word processor, the input controller can check its credit cache and determine that it has sufficient credit with the word processor to send the packets (as 300 B is less than the 500 B of credit). After the transaction, the input controller may deduct 300 B from its credit so that it can later determine that it may only send up to 200 B of packets to the word processor. Once the word processor receives the 300 B of packets and processes them, it may send an acknowledgement to the input controller to indicate that it is ready to receive another 300 B ("returning" the 300 B of credit to the input controller).

For purposes of this disclosure, an "agent" refers to a component or module of a system configured to send and/or consume credit in a credit-based flow control regime. Examples of agents can include, but are not limited to, communication agents such as INFINIBAND, peripheral component interface express (PCI-e), Ethernet, etc. A "transaction" involves consumption of credit (also referred to as "spending" credit) in order to send a payload (e.g., one or more packets of data) to an agent for processing. "Upstream" and "downstream," as used herein, are relative terms used in the context of the flow of the data sent in transactions. For example, as part of a transaction, an upstream agent spends credit to send a payload to a downstream agent. Once the downstream agent has processed the packet(s) included in the payload, the downstream agent returns the credit to the upstream agent. Notably, "spending" credit does not necessarily include the upstream agent sending the credit itself to the downstream agent; in many credit flow control systems, the upstream agent is configured to simply track how much credit it has and to deduct the amounts accordingly.

As described above, credit-based flow control enables systems to prevent overwhelming components by sending them more data than the receiver can handle at a given time. As an illustrative analogy, the upstream agent can be compared to a manufacturer of goods (data), while the downstream agent can be compared to a warehouse. The downstream agent may have a buffer, which can be compared to a number of loading bays at the warehouse. The manufacturer may send trucks full of goods to the warehouse, but it takes some time for the trucks to arrive at a loading bay, have their contents unloaded, and depart the loading bay. If an additional truck arrives when all loading bays are full, the warehouse is unable to receive the goods. To prevent such a loss in efficiency, credit-based flow control essentially describes a system where the warehouse informs the manufacturer how many loading bays it has (initial credits) and when a loading bay is freed (credit return). In turn, the manufacturer tracks how many loading bays should be available.

As a more detailed example, an upstream "sender" agent may attempt to transmit a payload including 800 kilobytes (kB) of data to a downstream "receiver" agent. The receiver may have a 1-megabyte (MB) buffer, meaning the receiver can store 1 MB of data that it has yet to process. The sender may accordingly have 1 MB worth of credit. Once the 800 kB of data is sent, the sender can deduct 800 kB of credit from its 1 MB, so the sender is aware that the receiver can only handle another 200 kB (assuming, for simplicity, 1 MB=1,000 kB, 1 MB−800 kB=1,000 kB-800 kB=200 kB). As the receiver processes the data and frees up space, it returns credits to the sender, such as by sending "flow control packets." For example, once the receiver has processed half of the 800 kB (i.e., 400 kB), it may send a flow control packet returning 400 kB of credit to the sender. The sender is thus aware that it can send up to 600 kB (200 kB+400 kB=600 kB) of data to the receiver.

Credit-based flow control can also be used in multiple-level systems, but as systems increase in complexity, drawbacks may increase in severity. In general, downstream delays tend to propagate upstream. As an example, a system may include three agents. A first agent may be configured to send a payload to a second agent, while the second agent may be configured to process that payload and send results of the processing to a third agent. In this example system, each pair of "adjacent" agents (i.e., the pair including the first and second agents, and the pair including the second and third agents) can function similarly to the "upstream" and "downstream" agents described above. However, once the second agent receives the payload, processes it, and sends the results to the third agent (spending credit to do so), the second agent may be unable to send additional results until the third agent returns credits indicating that it is ready to receive those additional results.

If the second agent receives an additional payload from the first agent, it might still be able to process this payload as well, but as noted it will be unable to send the corresponding results. Instead, the second agent may store those results until the third agent returns credit to the second agent. Over time, the second agent may run out of room and become unable to store results of additional payloads, and similarly will become unable to process more payloads, eventually resulting in the second agent being unable to receive further payloads from the first agent. In such an example system, the second agent may not return credit to the first agent until the third agent returns credit to the second agent. This "back pressure" can result in a credit shortage, meaning an agent may not have sufficient credits to initiate transactions it needs to perform. In particular, if the third agent processes results slower than the second agent generates them, then the second agent may eventually be waiting on the third agent; once the third agent returns credit to the second agent, the second agent may effectively "pass" it on to the first agent.

As the third agent slows down and causes the second agent to slow down, the second agent may, in turn, slow down the first agent in much the same way. This can become a more serious problem in larger, more complicated systems, as the first agent may be a higher-level module responsible for performing multiple tasks. In such an example, the third agent slowdown can, over time, prevent the first agent from performing several of its required tasks due to waiting on the second agent (because the second agent is waiting on the third agent). In addition, should the third agent fail (e.g., crash) rather than merely perform slowly, the slowdown can propagate substantially faster. In addition, common solutions to apparent agent failures are often time- and resource-intensive (such as suspending operations or terminating transactions until a developer can address the failure or even triggering a restart of the system). Further, some failures are only temporary; even if the third agent appears to stop responding/returning credit to the second agent, the third agent may be able to recover on its own. As a result, a temporary failure can trigger a disproportionately disruptive response. For example, the third agent could fail, resulting in the system suspending operations. But if the third agent recovers shortly afterwards, the suspension of operations may have been unnecessary. In particular, the system may not have even had any requests to send to the third agent during the time it was offline, but the failure response could still incur substantial resource costs.

This slowdown can be particularly problematic as the first agent may only have a minor backlog of data to send to the second agent, but if it lacks the credit to send that data, the first agent might still suffer performance penalties until the credit is received.

Systems and methods consistent with the present disclosure advantageously enable improved computer system performance by preventing/mitigating system slowdowns that result from an agent's temporary inability to process data. To accomplish this, agents can be provided with an improved credit cache to support designating new credit data structures, such as "speculative," "timed," etc. In essence, "speculative credit return" refers to the process of returning credit to an upstream agent despite being unable (at the time the speculative credit is returned) to process an amount of data that the credit indicates. For example, an agent returning speculative credit may have a full buffer, meaning it is unable to receive additional data (despite returning credit indicating that it can). As another example, the agent returning speculative credit may not have credit to spend with a downstream agent, even if the speculative credit indicates that it does. Continuing with the previous "three agents" example, if the third agent were to fail, causing a credit shortage (or resulting in a relatively high risk of a credit shortage occurring), systems and methods consistent with the present disclosure would enable the second agent to send "speculative" credit to the first agent rather than wait for the "standard" credit to be returned by the third agent. From the first agent's perspective, the speculative credit may be indistinguishable from "standard" credit. Thus, the first agent may proceed as if it had received the credit return, alleviating the slowdowns caused by the credit shortage.

As an example of an ideal outcome, the first agent may spend the speculative credit on a transaction with the second agent by transmitting a payload to the second agent, but the third agent may have recovered and returned the missing credit to the second agent by the time the second agent receives the payload from the first agent. Since the second agent has already returned credit to the first agent (i.e., the speculative credit), upon receiving the returned credit from the third agent, the second agent may convert the speculative credit to "standard" credit. Notably, in some instances, the second agent may not indicate this conversion to the first agent. This conversion may include changing an identification bit in a register in the agent. Conversion may be performed in a way that is transparent to the first agent, requiring no action from the first agent. This may prevent slowing down the first agent. As a result, the third agent may recover and be seamlessly reintegrated into the flow.

In some instances, the first agent may attempt to spend the speculative credit on a transaction with the second agent. However, because the speculative credit does not correspond to bandwidth that is available to be immediately claimed for the first agent's task, the second agent may delay performance of the task. For example, in some embodiments the second agent may return an error, such as by transmitting a "negative acknowledgment" signal to the first agent. The second agent may also ignore the transmission and/or delete the payload (either or both of which may be referred to as "dropping" the transaction), essentially aborting whatever request the first agent made. That error may include a request to retry the transaction, causing the first agent to resend the transaction at a later time. In some instances, the third agent may have returned the standard credit to the second agent before that later time, enabling the second agent to process the retried transaction. This outcome may be comparable (in terms of resource cost) to fault handling that the first agent may be configured to do with standard credits, and thus may not require the first agent to be configured to process the speculative credits in a different way. Once again, this may advantageously prevent the use of speculative credit by the second agent from causing undue slowdowns at the first agent.

Figure 1:
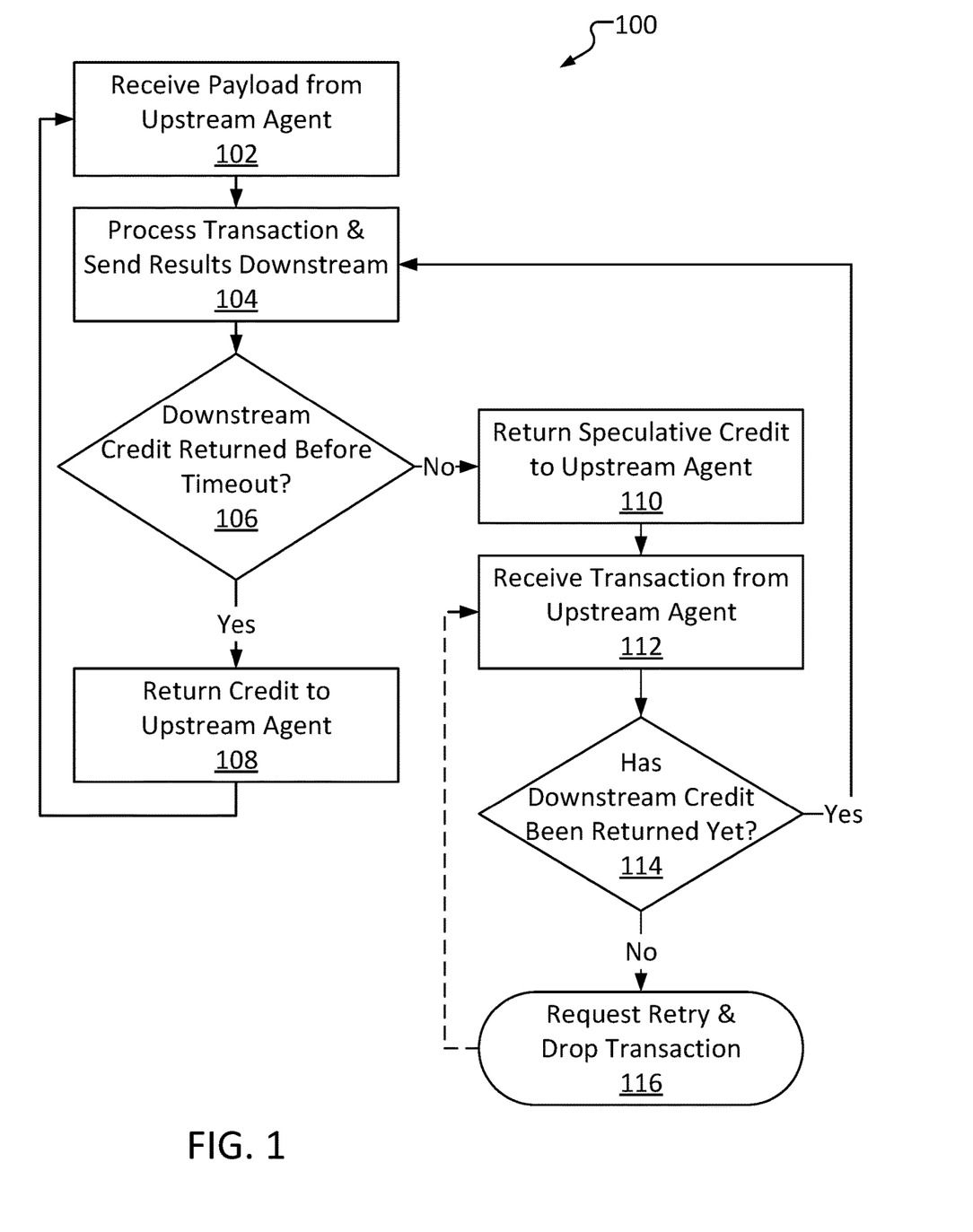
FIG. 1 is a high-level speculative credit return method, consistent with several embodiments of the present disclosure.

FIG. 1 is a high-level speculative credit return method 100, consistent with several embodiments of the present disclosure. Method 100 may be performed by, for example, an agent in a flow such as primary agent 212 of flow 200, described in further detail with reference to FIG. 2, below. Method 100 comprises receiving a payload from an upstream agent at operation 102. Operation 102 may include, for example, a peripheral component interface (PCI) controller receiving data from a central processing unit (CPU). The payload received via operation 102 may be an amount of packets required for a transaction initiated by an upstream agent. The transaction may entail the upstream agent instructing a primary agent to process the data into "results." In some instances, operation 102 may include recording the amount of data received, enabling an agent receiving the data to determine how much credit was spent to send the data.

Method 100 further comprises processing the transaction and sending results downstream at operation 104. Operation 104 may include, for example, a PCI controller converting data received from a CPU into PCI packets. Operation 104 may include sending the results (e.g., packets) to a third, downstream agent. An identity of the third agent may be designated by the first agent (such as in the data received via operation 102, as part of the transaction). Operation 104 may include spending credit previously received from a third, downstream agent. As a result, operation 104 may also include determining an amount of credit spent and deducting that amount from a tracked value. For example, the second agent performing operation 104 may have 800 kB of credit prior to operation 104, but the results sent via operation 104 may be 350 kB in size. As a result, operation 104 may also include deducting 350 kB from the 800 kB of credit held by the second agent, such that the second agent is left with 450 kB.

Method 100 further comprises determining whether downstream credit was returned within a given timeout period at operation 106. Operation 106 may include, for example, waiting for a predetermined amount of time, such as, for example, fifty microseconds, ten milliseconds, etc. This can be performed by starting a timer upon performance of operation 104. For example, a primary agent can transmit results to a downstream agent. Upon sending the results, the primary agent may start a ten millisecond timer. If ten milliseconds pass before credit is returned from the downstream agent, the timer has expired, meaning the downstream agent is considered to have "timed out."

If the credit is returned from the downstream agent before the timeout (106 "Yes"), method 100 further comprises returning standard credit to the upstream agent at operation 108.

If the credit is not returned before the timeout period elapses, method 100 further comprises returning speculative credit to the upstream agent at operation 110. Operation 110 may include, for example, returning credit to the upstream agent, but modifying a data structure to indicate that the credit is not "standard" credit, meaning the agent performing method 100 may not be able to accommodate (i.e., process, distribute, etc.) some or all future data received from the upstream agent based on the returned credit. For example, operation 110 may include appending a metadata tag to an entry in a credit cache; the metadata tag can indicate that the credit returned to the upstream agent is "speculative." Notably, in some instances, from the perspective of the upstream agent, operation 110 may appear substantially identical to operation 108.

Method 100 further comprises receiving more data from the upstream agent at operation 112. The data received at operation 112 could be related to the transaction operation 102 or could be a different transaction.

Method 100 further comprises determining whether the downstream agent has returned its credit yet at operation 114. if the credit has been returned from the downstream agent (114 "Yes"), method 100 returns to normal procedures (i.e., processing the received data via operation 104, transmitting results, etc.). If the downstream credit has still not been returned (114 "No"), method 100 proceeds to requesting a retry and/or dropping the transaction at operation 116. In some instances, 116 may be the end of method 100, whereas in other instances method 100 may return to receiving the same (or a different transaction at operation 112 and repeating the determination of operation 114.

In some instances, operation 116 may include requesting a retry of an oldest-buffered transaction rather than a most recently received transaction. For example, the primary agent may receive a first transaction (transaction "A") but may not have credit to send the associated results to the downstream agent. The primary agent may then receive a second transaction (transaction "B") and may be similarly unable to send results to the downstream agent. Further, transactions A and B may take up all of the primary agent's storage, meaning it can no longer process any subsequent transactions (but the primary agent may nonetheless return speculative credit). The upstream agent may attempt to send a third transaction (transaction "C"). In some instances, the primary agent may drop transaction C and request a retry, as it cannot accommodate transaction C. However, in some instances, the primary agent may instead drop transaction A and similarly request a retry of transaction A, while accepting transaction C and processing it using the space freed by transaction A.

Figure 2:
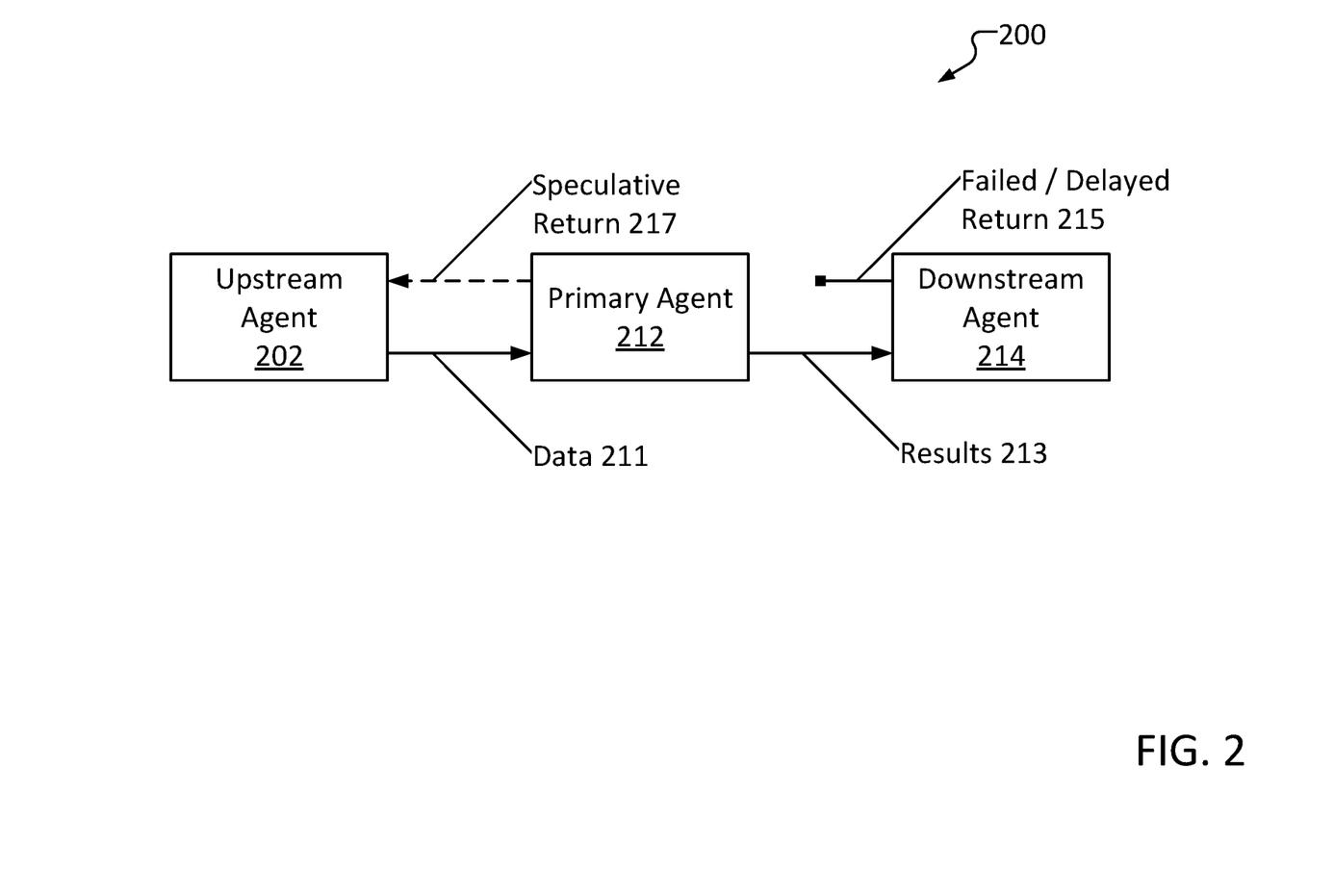
FIG. 2 is a diagram of a simple example flow implementing credit based flow control with speculative credit return, consistent with several embodiments of the present disclosure

FIG. 2 is a diagram of a simple example flow 200 implementing credit-based flow control with speculative credit return, consistent with several embodiments of the present disclosure. Flow 200 includes three agents, referred to as upstream agent 202 (alternatively, "first agent" 202), primary agent 212 (alternatively, "second agent" 212), and downstream agent 214 (alternatively, "third agent" 214). As shown in flow 200, upstream agent 202 is configured to transfer data 211 to primary agent 212, which processes the data and transmits the results 213 to downstream agent 214.

As downstream agent 214 receives and processes the results received from primary agent 212, downstream agent 214 may return credits to primary agent 212. Similarly, as primary agent 212 processes the data it receives from upstream agent 202 and transmits the results to downstream agent 214, primary agent 212 may return credit to upstream agent 202.

However, in the example depicted in FIG. 2, downstream agent 214 may have failed to return credits, as shown by the broken line 215. This failure can be due to a number of possible causes. For example, downstream agent 214 may have crashed. As another example, even if downstream agent 214 is still functioning, it may be experiencing congestion such that the credit return 215 is "overdue" (e.g., primary agent 212 may have determined that a timeout period has elapsed without credit return 215 being completed). Regardless of the possible cause, primary agent 212 may determine that downstream agent 214 has not returned the credits that primary agent 212 spent in transferring results via 213. In some embodiments, primary agent 212 may determine that the credits have not been returned during a predetermined timeout period. As a result, primary agent 212 may return speculative credit, shown in FIG. 2 as dashed line 217. In some instances, primary agent 212 may be configured to return speculative credit in a manner such that speculative credit return 217 may, to upstream agent 202, appear substantially identical to a standard credit return, except primary agent 212 may be presently incapable of accommodating an additional transaction from upstream agent 202. For example, credit return 217 may include sending a flow control packet with a header/payload identical to a flow control packet of a typical system. As a result, upstream agent 202 may not need to be capable of interpreting a new type of credit return, easing implementation of primary agent 212. However, primary agent 212 may still modify one or more fields in a credit cache to indicate that credit return 217 is speculative. This can be accomplished by, for example, appending a metadata tag, setting a bit to a predetermined value (e.g., "1" for speculative, "0" for standard), and the like. Further, as upstream agent 202 may be incapable of identifying that return 217 is speculative, agent 202 may proceed with normal operations, which can advantageously reduce slowdowns and prevent credit shortages.

In contrast, in a typical system, primary agent 212 might decline to return credit to upstream agent 202 until credit is returned from downstream agent 214. This delay can introduce "backpressure," causing congestion in upstream agent 202's workflow, including transactions with other agents not shown in FIG. 2. Put simply, by sending the new speculative credit data structure of the present disclosure, the primary agent 212 can "lie" to upstream agent 202, which may allow the upstream agent 202 to continue operating normally. Of course, if upstream agent 202 attempts to transmit an additional payload (similar to data transmission 211), primary agent 212 may be incapable of processing the data. In this instance, primary agent 212 may drop the transaction and/or request upstream agent 202 to retry the transaction at another time. However, if downstream agent 214 is able to recover and return credit to primary agent 212, primary agent 212 can redesignate speculative return 217 as a "standard" credit return. For example, primary agent 212 may include a data structure configured to track amounts of credit possessed by upstream agent 202. This data structure may include a field to indicate how much of this credit is speculative vs. standard. In such an instance, changing the designation of the credit can be performed by adjusting the value of the field (e.g., redesignating 200 kB of speculative credit to standard credit may involve changing values from "800 kB Standard | 200 kB Speculative" to "1 MB Standard | 0 B Speculative"). Notably, this redesignation does not necessarily require any interaction with upstream agent 202 or downstream agent 214. As a result, in some instances, primary agent 212 may be capable of returning speculative credit without modification to either upstream agent 202 or downstream agent 214, improving ease of implementing systems and methods consistent with the present disclosure. However, in some instances, upstream agent 202 may be capable of distinguishing between speculative credit and standard credit. This can enable, for example, upstream agent 202 to prioritize transactions with other agents (not shown in FIG. 2) before attempting transactions that would require spending speculative credit.

Figure 3:
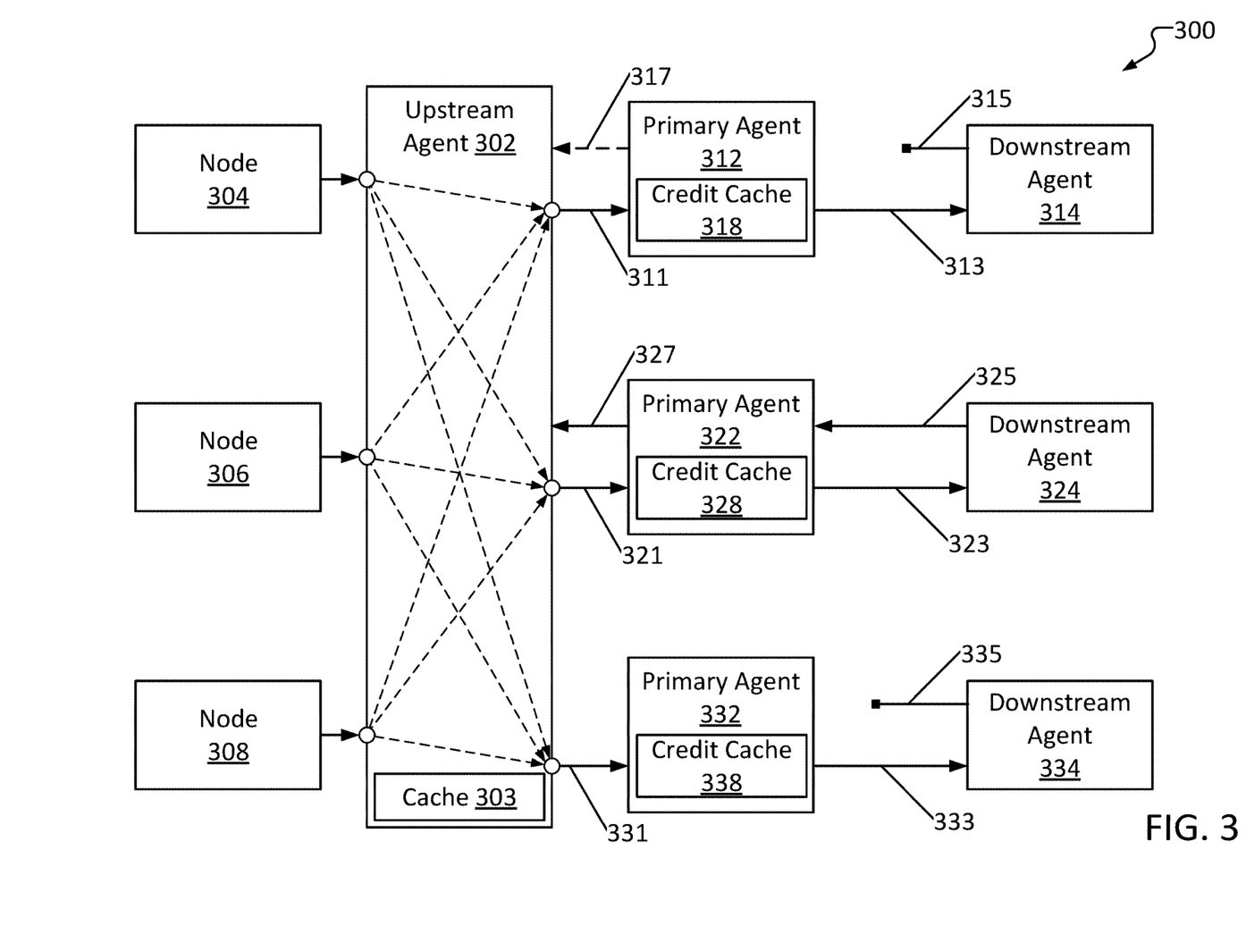
FIG. 3 is a diagram of a more complex flow implementing credit based flow control with speculative credit return, consistent with several embodiments of the present disclosure

FIG. 3 is a diagram of a more complex flow 300 implementing credit-based flow control with speculative credit return, consistent with several embodiments of the present disclosure. Flow 300 includes nodes 304, 306, and 308 (collectively, "nodes 304-308"). Nodes 304-308 may need data to be processed by one or more of downstream agents 314, 324, and 334. In order to send the data to the appropriate downstream agent, a node may send it to upstream agent 302. As depicted by the dashed arrows within upstream agent 302, an input to upstream agent 302 from any of nodes 304-308 can be sent to any of primary agents 312, 322, or 332. The primary agent can then process the data and send the results to the corresponding downstream agent.

Upstream agent 302 and primary agents 312-332 may utilize credit-based flow control. For example, in some instances, upstream agent 302 may refrain from sending data to a primary agent unless it has a pre-agreed-upon amount of credit indicating that the primary agent(s) are capable of processing the data. Notably, upstream agent 302's credit may be fungible, meaning that it may be "spent" to send data to any of primary agents 312, 322, and/or 332. Thus, if any primary agent delays in returning credit to upstream agent 302, upstream agent 302 may risk running low on credits, hindering performance of the entire flow 300.

FIG. 3 depicts three scenarios, implementing three different credit return actions. Primary agent 312 may not receive a complete credit return 315 from downstream agent 314, and performs a speculative credit return 317 in response. Primary agent 322 may receive a credit return 325 from downstream agent 324, and may perform a standard credit return 327 in response. Finally, primary agent 332 may not receive a credit return 335 from downstream agent 334, and may decline to perform any credit return (speculative or standard).

As an illustrative example, upstream agent 302 may send data to primary agent 322 via transaction 321. Upon initiating transaction 321, upstream agent 302 may deduct a first amount of credit corresponding to, for example, a size of the data sent to primary agent 322. Upstream agent 302 may deduct the first amount of credit from its own tracked amount of credit (which can be stored in cache 303). Upon receiving the data via 321, primary agent 322 may note that upstream agent 302 has spent the corresponding amount of credit, such as by modifying a stored value representing an amount of credit upstream agent 302 has outstanding. This value can be stored in credit cache 328.

Similarly, once primary agent 322 processes the received data and sends results of that processing to downstream agent 324 via transaction 323, primary agent 322 may deduct a second corresponding amount of credit from its own tracked amount of credit (which may also be stored in credit cache 328). In some instances, the amount of credit required for upstream agent 302 to transfer data (321) to primary agent 322 may be the same as the second amount of credit required for primary agent 322 to transfer results (323) to downstream agent 324. However, this is not necessarily always the case; for example, a size (e.g., in kB) of transaction 321 may be greater than a size of transaction 323. In other words, the data sent by upstream agent 302 may be larger than the processed results sent by primary agent 322. As a result, upstream agent 302 may spend more credit to perform transaction 321 than primary agent 322 spends to execute transaction 323.

Once downstream agent 324 is ready to receive additional results from primary agent 322, downstream agent 324 may return credit to primary agent 322, shown as credit return 325. Being able to send additional results to downstream agent 324 may free up resources for primary agent 322, enabling primary agent 322 to return credit to upstream agent 302, shown as credit return 325.

As another example, upstream agent 302 may send data to primary agent 312 via transaction 311. Upon initiating transaction 311 (e.g., by sending the payload), upstream agent 302 may deduct a third amount of credit corresponding to, for example, a size of the payload sent to primary agent 312 (such as, for example, a number of packets included in the payload). Upstream agent 302 may deduct the third amount of credit from its own tracked amount of credit. Upon receiving the data via 311, primary agent 312 may note that upstream agent 302 has spent the third amount of credit, such as by modifying a stored value representing an amount of credit upstream agent 302 has outstanding. Such a value may be stored in credit cache 318.

Similarly, once primary agent 312 processes the received data and sends results of that processing to downstream agent 314 via transaction 313, primary agent 312 may deduct a fourth amount of credit from its own tracked amount of credit. Once downstream agent 314 has received results via transaction 313, downstream agent 314 may be enabled to perform a given task (such as, for example, controlling a device, returning an answer to one of nodes 304-308, etc.).

Once downstream agent 314 is ready to receive additional results from primary agent 312, downstream agent 314 may attempt to return credit to primary agent 312. However, in the example depicted in FIG. 3, downstream agent 314 may not have successfully returned credit to primary agent 312, as shown by incomplete credit return 315. In some instances, downstream agent 314 may have failed and thus may be unable to complete credit return 315. In some instances, downstream agent 314 may be capable of returning credit but may be congested such that credit return 315 may be incomplete by the time a timeout period expires. In other words, downstream agent 314 may not have returned the credit for a duration of time greater than a predetermined timeout. In some instances, this timeout duration can be adjusted (such as by a developer of flow 300). For example, in some instances, the timeout duration can be set to zero, effectively causing primary agent 312 to return speculative credit 317 immediately upon sending transaction 313 to downstream agent 314 regardless of whether downstream agent 314 is functioning or not. Such an "instant" timeout can be useful, for example, when testing functionality of the agents. As another example, setting all agents in a flow to timeout instantly can be functionally similar to disabling credit-based flow control (while being practically simple to implement). Upon detecting that downstream agent 314 has not returned credit (315) before the expiration of a timeout period, primary agent 312 may return speculative credit (317) to upstream agent 302.

In some instances, primary agent 312 may track (via credit cache 318) an amount of "outstanding" or "expected" credit from downstream 314. This amount of outstanding credit may be related to an amount of credit primary agent 312 has spent sending payloads to downstream agent 314, such as via transaction 313. Primary agent 312 may expect or anticipate receiving all of the credit it spent on transaction 313 back once downstream agent 314 has completed its tasks related to transaction 313. In some instances, downstream agent 314 may have returned a portion of this credit but not all of the expected credit. For example, transaction 313 may require 500 kB of credit, and as a result, primary agent 312 may expect to receive 500 kB of credit returned from downstream agent 314. However, primary agent 314 may return 300 kB of credit, meaning 200 kB of credit is still outstanding. How primary agent 312 responds to this situation can vary depending upon implementation.

For example, in some instances, primary agent 312 may extend a timeout duration upon receiving a partial credit return from downstream agent 314, providing downstream agent 314 additional time to return the outstanding credit. In some instances, primary agent 312 may return the entire amount of credit 317, but note (such as via a field in credit cache 318) that an amount of credit "missing" from 315 is speculative, while the amount actually returned from downstream agent 314 is actually standard credit. Continuing with the previous "500 kB" example, primary agent 312 may return, via 317, 500 kB of credit, but may note in credit cache 318 that 200 kB of that credit is speculative. Thus, the amount of speculative credit returned 317 can be based upon an amount of credit returned by downstream agent 314 (including whether the amount of credit returned by downstream agent 314 is zero).

In some instances, a "partially speculative" credit return such as the example described above may, in some instances, be indicated to upstream agent 302 as well. While this may require upstream agent 302 to be capable of distinguishing between speculative credit and standard credit, upstream agent 302 may utilize this information to decide which transactions to perform next.

As an example, upon receiving 300 kB of standard credit and 200 kB of speculative credit via 317, upstream agent may opt to delay sending a 400 kB transaction to primary agent 312, prioritizing another transaction to primary agent 332 instead. As another example, upon receiving the partially speculative credit return, upstream agent 302 may opt to choose a 300 kB transaction to send to primary agent 312 rather than a different, 450 kB transaction. However, over time, upstream agent 302 may eventually begin utilizing the speculative credit as well, in the hopes that downstream agent 314 has completed its credit return to primary agent 312. This can advantageously balance the benefits of speculative credit (e.g., enabling agent 302 to proceed with various operations) and the risks (e.g., agent 302 may still attempt to send transactions that primary agent 312 is not capable of executing, but these transactions may be relatively delayed to increase the chance the downstream agent 314 can seamlessly reintegrate back into flow 300).

As described above, in some instances, the speculative credit return 317 may enable upstream agent 302 to operate as if it had received standard credit. Put differently, upstream agent 302 may treat standard credit return 327 and speculative credit return 317 in a substantially similar manner (other than the identity of the agent returning the credit and possibly the amount of credit returned). For example, in both instances, upstream agent 302 may proceed as if it received the full amount of credit represented by credit return 315 or 325. However, primary agent 312 may track that credit return 317 is speculative. For example, a value in credit cache 318 may indicate an amount of speculative credit allocated to upstream agent 302. This way, if downstream agent 314 eventually recovers from whatever issue caused it to time out, it can still return its credit to primary agent 312. In such a situation, primary agent 312 can convert speculative credit 317 to standard credit. In addition, if downstream agent 314 only returns a portion of the expected credit, primary agent 312 can adjust the amount of speculative credit allocated to upstream agent 302. For example, downstream agent 314 may return 75% of the credit consumed by primary agent 312 in executing transaction 313. In response, primary agent 312 may modify credit cache 318 to indicate that only 25% of the speculative credit returned at 317 remains speculative, thus modifying the remaining 75% into standard credit.

As an additional example, upstream agent 302 may send data to primary agent 332 via transaction 331. Upon executing transaction 331 (e.g., by sending the data), upstream agent 302 may deduct a fifth amount of credit corresponding to, for example, a size of the data sent to primary agent 332. Upstream agent 302 may deduct the third amount of credit from its own tracked amount of credit (e.g., stored in cache 303). Upon receiving the data via 331, primary agent 332 may note that upstream agent 302 has spent the fifth amount of credit, such as by modifying a stored value representing an amount of credit upstream agent 302 has outstanding. Such a value may be stored in credit cache 338.

Similarly, once primary agent 332 processes the received data and sends results of that processing to downstream agent 334 via transaction 333, primary agent 332 may deduct a sixth amount of credit from its own tracked amount of credit, which may also be stored in credit cache 338.

Once downstream agent 334 is ready to receive additional results from primary agent 332 (e.g., once downstream agent 334 has worked through a period of congestion, has recovered from a crash, etc.), downstream agent 334 may attempt to return credit to primary agent 332. However, in the example depicted in FIG. 3, downstream agent 334 may not have successfully returned credit to primary agent 332, as shown by incomplete credit return 335 (similar to incomplete credit return 315). In some instances, downstream agent 334 may have failed. In some instances, downstream agent 334 may still be functional, but a timer monitored by primary agent 332 may have expired prior to credit return 335 being completed. In some instances, downstream agent may have returned a portion of the expected credit, but not all of it.

Systems and methods consistent with the present disclosure enable primary agents to return speculative credit, such as via return 317, to advantageously enable an upstream agent (such as upstream agent 302) to continue operating normally even in the event of a downstream agent failure. However, primary agents consistent with the present disclosure may, in some embodiments, delay speculative credit returns until a timeout period has elapsed. Thus, FIG. 3 may be interpreted to depict an example flow 300 where both downstream agents 314 and 334 have failed to return their respective credits, but where downstream agent 314 has timed out (resulting in primary agent 312 to return speculative credit 317) while downstream agent 334 has not yet timed out (resulting in primary agent 332 to refrain from returning any credit while it waits for the timeout period).

In some instances, if a second timeout has elapsed, speculative credit may be rescinded in favor of returning an error. For example, primary agent 332 may wait for downstream agent 334 to return credit for a first timeout period (e.g., 10 milliseconds) before sending speculative credit to upstream agent 302 (similar to 317). However, after returning the speculative credit, if a second timeout period (e.g., one second) elapses and credit still has not been returned by downstream agent 334, primary agent 332 may rescind the speculative credit to inform upstream agent 302 that downstream agent 334 appears to have failed. This is described in further detail below with reference to FIG. 4.

Figure 4:
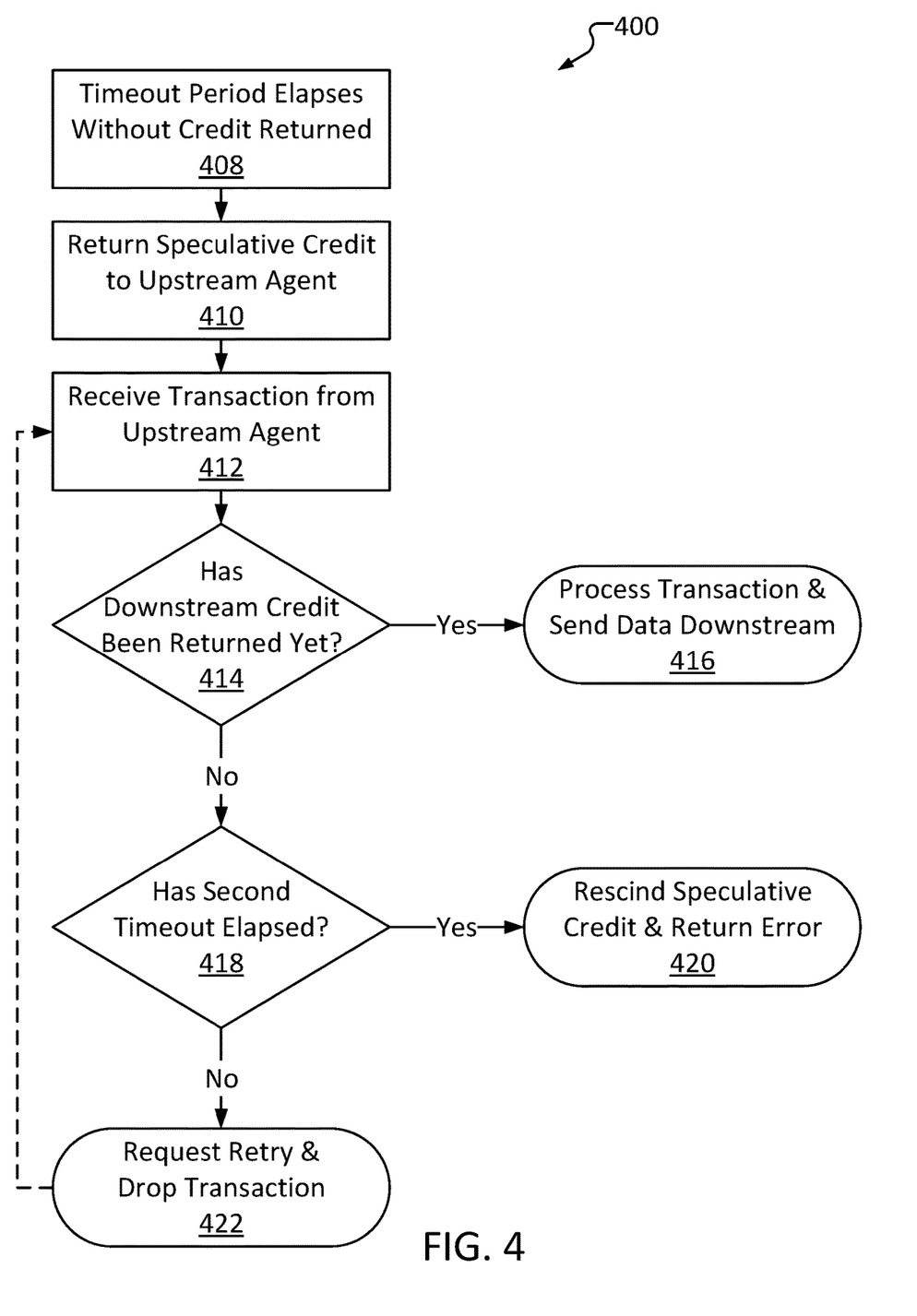
FIG. 4 is a method of credit-based flow control fault handling including multiple timeout periods, consistent with several embodiments of the present disclosure.

FIG. 4 is a method 400 of credit-based flow control fault handling including multiple timeout periods, consistent with several embodiments of the present disclosure. Method 400 may be performed by an agent in a credit-based flow control system such as, for example, primary agent 312 of flow 300, described above with reference to FIG. 3.

Method 400 comprises determining that a first timeout period has elapsed without receiving a credit return from a downstream agent at operation 408. Operation 408 may include monitoring a timer after spending credits by sending data to the downstream agent. For example, upon performing transaction 313 of FIG. 3, primary agent 312 may monitor for a credit return from downstream agent 314. Operation 408 may thus include determining that no credit (or insufficient credit) has been returned from the downstream agent before a predetermined amount of time elapses. The timeout period may be, for example, one millisecond, ten milliseconds, 500 milliseconds, etc.

Method 400 further comprises returning speculative credit to an upstream agent at operation 410. Operation 410 may include, for example, returning credit to the upstream agent despite being incapable of performing functionalities suggested by the credit. Referring again to FIG. 3, operation 410 may be represented by speculative credit return 317. As noted above, from the perspective of the upstream agent, the speculative credit may appear identical to "standard" credit. For example, the upstream agent may not be "aware" that credit can even be speculative at all. However, the primary agent returning the speculative credit may track that it has done so, such as by setting a value in a register to indicate that the credit is speculative. This can advantageously improve ease of implementation; the primary agent can interface with "unmodified" upstream/downstream agents. In some instances, operation 410 may include sending a message to the upstream agent indicating that the credit expires after a programmable duration (e.g., 50 microseconds, 10 milliseconds, etc.).

As an illustrative example, the primary agent may have allocated 1 MB of credit to the upstream agent. The primary agent may also have 1 MB of credit from a downstream agent. The primary agent may store both of these values in a credit cache. In operation, the upstream agent may spend 800 kB of credit in sending data to the primary agent. The primary agent may note that the upstream agent only has 200 kB of credit remaining (but the primary agent may still have 1 MB of credit to spend on sending data to the downstream agent). The primary agent may then process the data into results, sending the results to the downstream agent. For purposes of this example, the results may be assumed to require 600 kB of credit from the primary agent. Thus, the primary agent may also update its stored values to indicate that the upstream agent has 200 kB of credit remaining while the primary agent has 400 kB of credit remaining. The primary agent then may wait for the 600 kB of credit to be returned from the downstream agent. In some instances, the downstream agent may process the results it received from the primary agent and then return the 600 kB of credit. However, in this example, the downstream agent may not return any credit for over ten milliseconds, which may be the first timeout period. Not receiving any credit for this amount of time may be correlated to a substantial risk of a credit shortage.

Upon detecting this risk of a credit shortage, the primary agent may be configured to return 800 kB of speculative credit to the upstream agent. However, as part of operation 410, the primary agent may be configured to note that the upstream agent "thinks" it has 1 MB of credit, but in reality, it has 200 kB of "standard" credit and 800 kB of speculative credit. This can be achieved by, for example, creating an entry in an array for every flow control packet of credit returned to the upstream agent. The entry can include an indicator bit to represent whether the credit is speculative credit or standard credit. As the upstream agent consumes credit, the primary agent can update the entries in the array. In tracking usage of credit, the primary agent may prioritize usage of standard credit before speculative credit. Continuing with the previous example, the upstream agent may spend 150 kB of credit on a transaction. The primary agent may update its credit tracking array to deduct 150 kB of standard credit, resulting in the upstream agent having 50 kB of standard credit and 800 kB of speculative credit.

Method 400 further comprises receiving a transaction from the upstream agent at operation 412. The transaction received at operation 412 may be a new transaction and may require the upstream agent to spend some or all of the speculative credit returned at operation 410. Continuing with the previous example, the new transaction may require 150 kB of credit, meaning the primary agent can execute the transaction and that the upstream agent may still retain 50 kB of standard credit alongside the 800 kB of speculative credit.

Notably, in some instances, the upstream agent may have sufficient standard credit for the new transaction, meaning the primary agent may be able to execute the transaction normally. In such an instance, the primary agent may simply execute the transaction as requested by the upstream agent, updating the various credit trackers accordingly.

Assuming the new transaction requires more standard credit than is available (for example, the new transaction may require 600 kB of credit while only 200 kB of standard credit is available), method 400 further comprises determining whether downstream credit has been returned yet at operation 414. If the downstream credit has been returned (414 "Yes"), method 400 further comprises processing the transaction and sending the results/data downstream at 416.

If the downstream credit has still not been returned (414 "No") by the time the new transaction is received via operation 412, method 400 further comprises determining whether a second timeout period has elapsed at operation 418. In some instances, the downstream agent may have returned some of the required credit, but not enough. Continuing with the same example, the downstream agent may have returned 300 kB of credit (but the new transaction would still require another 100 kB of credit). If the second timeout period has elapsed without enough credit being returned (418 "Yes"), method 400 proceeds to rescinding the speculative credit and returning an error at 420. Operation 420 may include, for example, transmitting a message to the upstream agent indicating that a set amount of credit is no longer valid. This message may also indicate that the downstream agent has failed or is otherwise unable to perform operations until further notice.

If the second timeout period has not yet elapsed (418 "No"), method 400 proceeds to dropping the transaction and requesting a retry at 422. Notably, the retry request may not indicate that the downstream agent is encountering problems; instead, the retry request may be a typical error message, similar to an error message associated with a transmission error, etc. In other words, 422 may maintain the speculative credit, implying to the upstream agent that the primary agent is capable of processing the transaction. In some instances, the transaction may not be retried immediately (e.g., the transaction may be placed back into a queue), allowing some additional time for the downstream agent to recover and return its credits.

In short, the example speculative credit return of operation 410 discussed above may be considered an attempt to disguise/conceal the possibility that the downstream agent has failed, allowing the downstream agent a chance to recover on its own and reintegrate seamlessly into the flow. The second timeout period of operation 418 may be adjusted based on, for example, how much time the downstream agent may be expected to require in order to recover from a non-fatal error. Should this recovery take too long (418 "Yes"), the error return of 420 may, in some instances, function as an acknowledgement that the downstream agent has actually failed.

In some instances, the second timeout period may be directly programmed into the speculative credit. In other words, the primary agent may return credit with an expiration timer. In contrast to the "rescinding" embodiments where the upstream agent is not made aware that the speculative credit is speculative/that the primary agent is not guaranteed to be capable of processing data associated with the credit, the lifetime of the "expiring" credit may be indicated to the upstream agent. For example, the upstream agent may be informed that it has 800 kB of credit that expires in two seconds, along with 300 kB of standard credit (1.1 MB of total credit). If two seconds elapse, the upstream agent may be aware that its 800 kB of credit has expired, meaning the primary agent is no longer committed to processing 800 kB of possible data. As a result, the upstream agent may only have the 300 kB of standard credit remaining. Should the downstream agent return sufficient credit to the primary agent prior to the speculative credit expiring, the primary agent may indicate to the upstream agent that the expiring credit is no longer on a timer (e.g., that it has been converted to standard credit).

Figure 5:
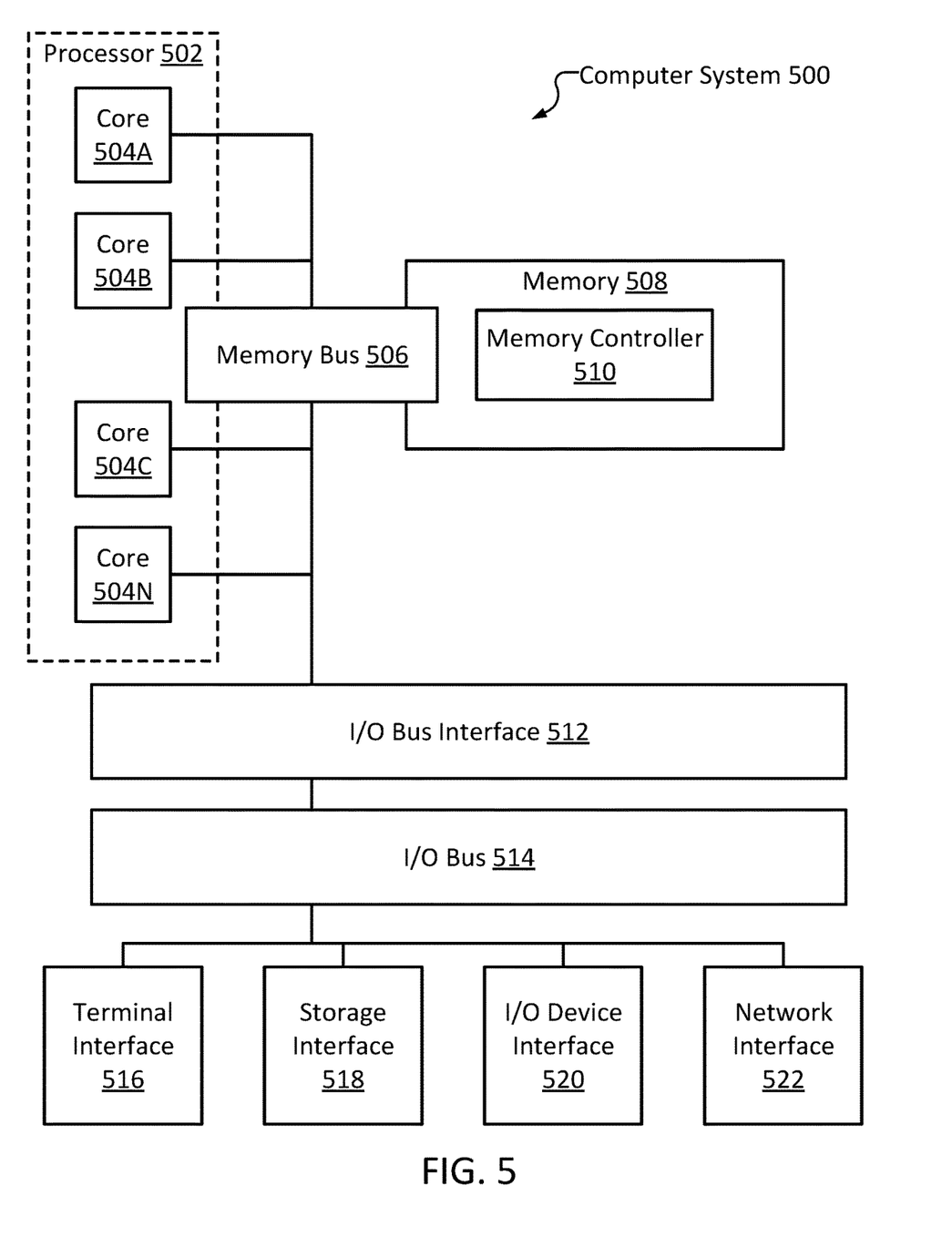
FIG. 5 illustrates a high-level block diagram of an example computer system that may be used in implementing embodiments of the present disclosure.

Referring now to FIG. 5, shown is a high-level block diagram of an example computer system 500 that may be configured to perform various aspects of the present disclosure, including, for example, methods 100 and/or 400. The example computer system 500 may be used in implementing one or more of the methods or modules, and any related functions or operations, described herein (e.g., using one or more processor circuits or computer processors of the computer), in accordance with embodiments of the present disclosure. In some embodiments, the major components of the computer system 500 may comprise one or more CPUs 502, a memory subsystem 508, a terminal interface 516, a storage interface 518, an I/O (Input/Output) device interface 520, and a network interface 522, all of which may be communicatively coupled, directly or indirectly, for inter-component communication via a memory bus 506, an I/O bus 514, and an I/O bus interface unit 512.

The computer system 500 may contain one or more general-purpose programmable central processing units (CPUs) 502, some or all of which may include one or more cores 504A, 504B, 504C, and 504D, herein generically referred to as the CPU 502. In some embodiments, the computer system 500 may contain multiple processors typical of a relatively large system; however, in other embodiments the computer system 500 may alternatively be a single CPU system. Each CPU 502 may execute instructions stored in the memory subsystem 508 on a CPU core 504 and may comprise one or more levels of on-board cache.

In some embodiments, the memory subsystem 508 may comprise a random-access semiconductor memory, storage device, or storage medium (either volatile or non-volatile) for storing data and programs. In some embodiments, the memory subsystem 508 may represent the entire virtual memory of the computer system 500 and may also include the virtual memory of other computer systems coupled to the computer system 500 or connected via a network. The memory subsystem 508 may be conceptually a single monolithic entity, but, in some embodiments, the memory subsystem 508 may be a more complex arrangement, such as a hierarchy of caches and other memory devices. For example, memory may exist in multiple levels of caches, and these caches may be further divided by function so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 502. This may include a memory controller 510.

Although the memory bus 506 is shown in FIG. 5 as a single bus structure providing a direct communication path among the CPU 502, the memory subsystem 508, and the I/O bus interface 512, the memory bus 506 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 512 and the I/O bus 514 are shown as single respective units, the computer system 500 may, in some embodiments, contain multiple I/O bus interface units 512, multiple I/O buses 514, or both. Further, while multiple I/O interface units are shown, which separate the I/O bus 514 from various communications paths running to the various I/O devices, in other embodiments, some or all of the I/O devices may be connected directly to one or more system I/O buses.

In some embodiments, the computer system 500 may be a multi-user mainframe computer system, a single-user system, or a server computer or similar device that has little or no direct user interface but receives requests from other computer systems (clients). Further, in some embodiments, the computer system 500 may be implemented as a desktop computer, portable computer, laptop or notebook computer, tablet computer, pocket computer, telephone, smartphone, mobile device, or any other appropriate type of electronic device.

It is noted that FIG. 5 is intended to depict the representative major components of an exemplary computer system 500. In some embodiments, however, individual components may have greater or lesser complexity than as represented in FIG. 5, components other than or in addition to those shown in FIG. 5 may be present, and the number, type, and configuration of such components may vary.

What is claimed is:

1. A method, comprising:
   sending a first payload to a downstream agent;
   monitoring a timer;
   determining, based on the monitoring, that the downstream agent has not returned a first amount of credit within a first timeout duration;
   returning, responsive to the determining, a second amount of speculative credit to an upstream agent without having received the first amount of credit from the downstream agent;
   receiving a transmission from the upstream agent, wherein the transmission is sent as part of a transaction, the transaction requiring the upstream agent to spend at least part of the speculative credit;
   detecting, after the receiving, that the downstream agent has still not returned the first amount of credit;
   instructing, in response to the detecting, the upstream agent to repeat the transmission; and
   dropping the transaction in response to the detecting.

2. The method of claim 1, wherein dropping the transaction comprises deleting a second payload included in the transmission.

3. The method of claim 1, wherein the second amount of speculative credit is based on the first amount of credit.

4. The method of claim 1, further comprising sending a message to the upstream agent, wherein the message indicates that the speculative credit expires after a programmable duration elapses.

5. The method of claim 1, further comprising:
   receiving a credit return from the downstream agent after returning the speculative credit; and
   converting, in response to the receiving the credit return, the speculative credit to standard credit.

6. The method of claim 1, further comprising:
   receiving a transmission from the upstream agent as part of a transaction;
   detecting that the upstream agent has sufficient standard credit for the transaction; and
   executing the transaction in response to the detecting.

7. The method of claim 6, wherein the transmission includes a payload for processing, and wherein executing the transaction comprises forwarding the payload to the downstream agent.

8. A system, comprising:
   a memory; and
   a central processing unit (CPU) coupled to the memory, the CPU configured to:
   send a first payload to a downstream agent;
   monitor a timer;
   determine, based on the monitoring, that the downstream agent has not returned a first amount of credit within a first timeout duration;
   return, responsive to the determining, a second amount of speculative credit to an upstream agent without having received the first amount of credit from the downstream agent;
   receive a transmission from the upstream agent, wherein the transmission is sent as part of a transaction, the transaction requiring the upstream agent to spend at least part of the speculative credit;
   receive a credit return from the downstream agent after returning the speculative credit; and
   convert, in response to the receiving the credit return, the speculative credit to standard credit.

9. The system of claim 8, wherein the CPU is further configured to:
   detect, after the receiving, that the downstream agent has still not returned the first amount of credit;
   instruct, in response to the detecting, the upstream agent to repeat the transmission; and
   drop the transaction in response to the detecting.

10. The system of claim 9, wherein dropping the transaction comprises deleting a second payload included in the transmission.

11. The system of claim 8, wherein the second amount of speculative credit is based on the first amount of credit.

12. The system of claim 8, wherein the CPU is further configured to send a message to the upstream agent, wherein the message indicates that the speculative credit expires after a programmable duration elapses.

13. The system of claim 8, wherein the CPU is further configured to:
   receive a transmission from the upstream agent as part of a transaction;
   detect that the upstream agent has sufficient standard credit for the transaction; and
   execute the transaction in response to the detecting.

14. The system of claim 13, wherein the transmission includes a payload for processing, and wherein executing the transaction comprises forwarding the payload to the downstream agent.

15. A computer program product, the computer program product comprising a non-transitory computer readable storage medium having program instructions embodied therewith, the program instructions executable by a computer to cause the computer to:
   receive a first transmission from an upstream agent, wherein the first transmission is sent as part of a first transaction, the first transaction requiring the upstream agent to spend a first amount of credit;

monitor a timer;
detect, based on the monitoring, that a first timeout duration has elapsed;
return, based on the detecting, a second amount of speculative credit to the upstream agent;
determine that the first transaction has not been completed within the first timeout duration, wherein the returning is further based on the determining;
send a payload to a downstream agent, wherein the first payload is based on the first transaction;
determine, based on the monitoring, that the downstream agent has not returned a third amount of credit within the first timeout duration, wherein the returning is further based on the determining;
receive a second transmission from the upstream agent, wherein the second transmission is sent as part of a second transaction, the second transaction requiring the upstream agent to spend at least part of the second amount of speculative credit;
identify, after the receiving the second transmission, that the downstream agent has still not returned the third amount of credit;
instruct, responsive to the identifying, the upstream agent to repeat the transmission; and
drop, responsive to the identifying, the transaction.

* * * * *